L. EHRLICH.
FABRIC MEASURING AND COST COMPUTING MACHINE.
APPLICATION FILED FEB. 16, 1918.

Inventor
Leo Ehrlich

L. EHRLICH.
FABRIC MEASURING AND COST-COMPUTING MACHINE.
APPLICATION FILED FEB. 16, 1918.

1,388,454.

Patented Aug. 23, 1921.
5 SHEETS—SHEET 3.

Inventor
Leo Ehrlich

L. EHRLICH.
FABRIC MEASURING AND COST COMPUTING MACHINE.
APPLICATION FILED FEB. 16, 1918.

1,388,454.

Patented Aug. 23, 1921.

Inventor
Leo Ehrlich

UNITED STATES PATENT OFFICE.

LEO EHRLICH, OF ST. LOUIS, MISSOURI, ASSIGNOR OF ONE-HALF TO ARTHUR S. PARTRIDGE, OF ST. LOUIS, MISSOURI, AND ONE-HALF TO ALBERT BLAIR, OF ST. LOUIS, MISSOURI.

FABRIC-MEASURING AND COST-COMPUTING MACHINE.

1,388,454.  Specification of Letters Patent.  Patented Aug. 23, 1921.

Application filed February 16, 1918. Serial No. 217,502.

*To all whom it may concern:*

Be it known that I, LEO EHRLICH, a citizen of the United States, residing at St. Louis, Missouri, have invented a certain new and useful Improvement in Fabric-Measuring and Cost-Computing Machines, of which the following is a full, clear, and exact description, such as will enable others skilled in the art to which it appertains to make and use the same, reference being had to the accompanying drawings, forming part of this specification.

My invention relates to a fabric measuring and cost computing machine, particularly of the type adapted for use in stores by salesmen, for measuring goods such as cloth, fabric, ribbon and the like, indicating in numbers the exact amount of the measured portion of the goods, computing the cost price or amount to be charged for said measured portion, said measuring, indicating and computing operations being simultaneously accomplished as the fabric or other material is drawn through the machine, and said machine also performing the functions of a cash register inasmuch as it is equipped with means for registering on duplicate sales slips or tickets the exact amount of cash and goods involved in each transaction.

The principal objects of my invention are, to generally improve upon and simplify the existing types of machines of the character to which my invention relates; to provide a machine which is comparatively small, compact and readily adaptable for use on counters where goods are sold; to provide a machine having a relatively small number of gears and operating parts, thereby reducing to a minimum the liability of the machine becoming inoperative through failure of its parts to function properly and likewise minimizing the initial cost of manufacture, and the cost of repairs; to arrange the operating parts of the machine within a relatively dust and lint-proof housing; to provide a machine wherein the cost or price calculations are positively and accurately performed by mechanical means, thereby insuring accuracy and wholly eliminating the necessity for any calculations, mental or otherwise, upon the part of the clerk or person manipulating the instrument; and further, to provide for the registering on duplicate sales slips or tickets which are readily positioned within and removed from the machine, the exact amount of cash involved in each transaction, and likewise, the amount of goods measured and sold.

Still further objects of my invention are, to provide a fabric measuring and cost computing machine having a relatively large capacity; to provide simple means for resetting the pointers or indicating fingers to zero positions; to provide means on the underside of the machine, preferably vacuum, or suction cups which are effective in anchoring the machine on a counter or showcase during use, and further, to provide attachments which can be readily applied to or removed from the machine housing and which will conveniently support bolts or small rolls of comparatively narrow material such as ribbon while the same is being drawn through the machine.

With the foregoing and other objects in view my invention consists in certain novel features of construction and arrangement of parts, hereinafter more fully described and claimed, and illustrated in the accompanying drawings, in which—

Figure 7:
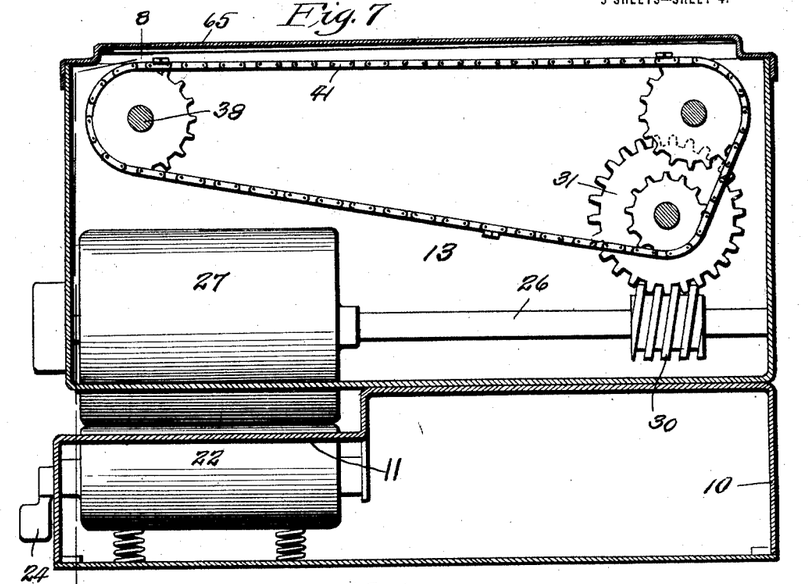
Fig. 7 is a vertical longitudinal section taken through the center of a modified form of the machine.
Figures 8, 9, 10:
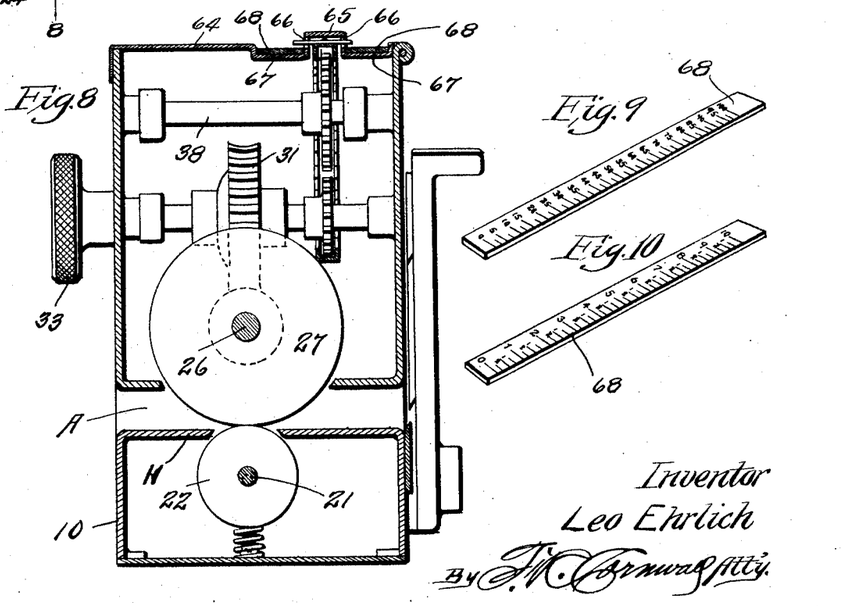
Fig. 8 is a cross sectional view taken approximately on the line 8—8 of Fig. 7.
Figs. 9 and 10 are perspective views of scale bearing plates or tablets which are removably positioned on the housing of the modified form of machine.
Figure 11:
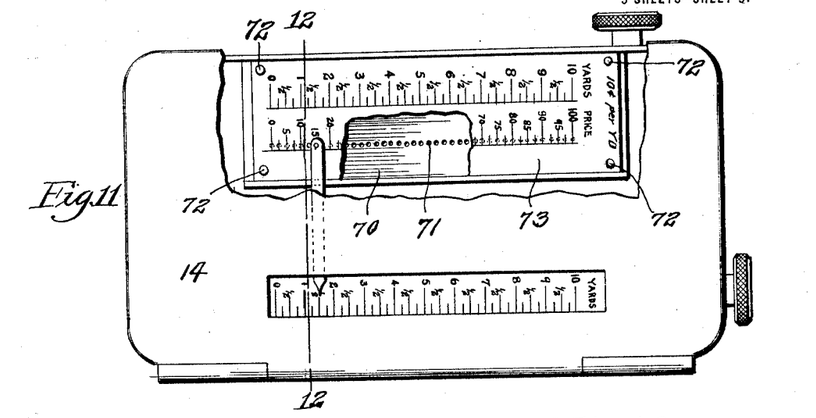
Fig. 11 is a plan view of the type of machine utilized for registering the amount of cash and goods measured at each operation.
Figure 12:
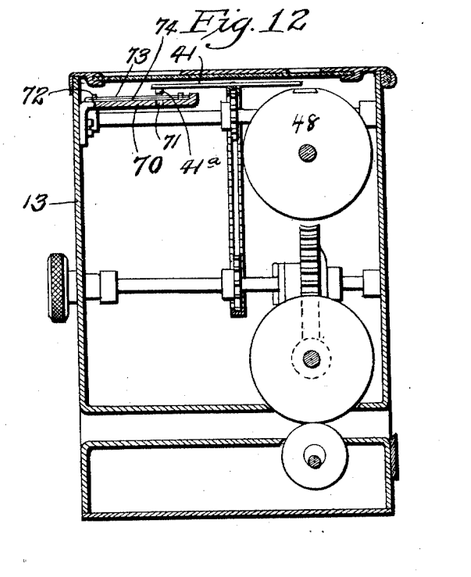
Fig. 12 is a cross section taken approximately on the line 12—12 of Fig. 11.
Figure 13:
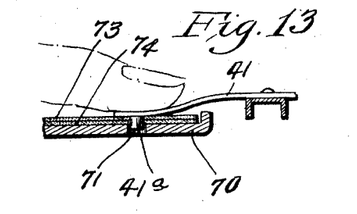
Fig. 13 is an enlarged detail view illustrating the means utilized for marking the duplicate sales tickets.

Referring by numerals to the accompanying drawings, particularly to Figs. 1 to 6 inclusive, which illustrate a practical embodiment of my invention, 10 designates a hollow substantially box-like structure, preferably formed of sheet metal pressed to proper shape and which serves as the base of my improved machine. A portion 11 of the top plate of this base member is depressed so that it occupies a horizontal plane a short distance below that occupied by the other portion of said top plate as shown in Fig. 7, and formed in this depressed portion is a longitudinally disposed opening 12 (see Fig. 4).

Positioned on top of the base member 10 and secured thereto in any suitable manner is the main housing or body 13 of the machine, the same being preferably formed of sheet metal, box-like in structure and including a base or bottom wall, a pair of side walls, and a pair of end walls. The top of this main housing is normally closed by a plate 14, one side edge of which is preferably hinged to one of the side walls of the upper housing and formed in said top plate is a pair of longitudinally disposed openings 15 and 16.

Secured in any suitable manner to the underside of the plate 14 is a section 17 of transparent material such as glass or celluloid, the same normally closing the openings 15 and 16. It will be noted that this cover plate 14 closes the entire top of the housing, and consequently when said cover plate is swung upward or into open position, ready access may be had to the interior of the main housing of the machine thereby greatly facilitating the assembling of the operating parts of the machine and the making of repairs and adjustments when necessary, and likewise permitting the ready removal of the chart-bearing drums.

Journaled in suitable bearings formed in the front wall of the base 10 and in a plate or bracket 18 which depends from the top plate of said base to the rear of the opening 12 are trunnions 19 and 20 which are eccentrically arranged on the ends of a shaft 21. Loosely mounted on this shaft 21 is a drum or roller 22 which may be properly termed a pressure roller in that it normally exerts yielding pressure against a measuring roller hereinafter more fully described.

Secured to the trunnion 20 is the inner end of a convolute spring 23, the outer end thereof being secured in any suitable manner to the bracket 18. This spring normally tends to rock the trunnions 19 and 20 in their bearings so as to maintain the roller 22 against the underside of the measuring roller, and in order to move said roller 22 downward in order to position the end of a piece of fabric between the rollers, I mount on the end of trunnion 19 a short laterally projecting handle 24, the same occupying a position immediately adjacent to the front wall of base housing 10.

Journaled in suitable anti-friction bearings 25 in the front and rear walls of the housing 13 are the ends of a shaft 26 upon which is fixed a measuring roller or drum 27, the same having a circumference of fixed or definite length. The lower portion of this measuring roller passes through an opening 28 formed in the bottom wall or plate of housing 13. (See Figs. 3 and 4.)

Formed integral with or fixed to the bottom of housing 13 immediately to the rear of the opening 28 is an upwardly projecting wall or flange 29 which is effective in preventing lint, dust and the like from passing upwardly through opening 28 into the chamber within housing 13. In this connection it will be understood that any heavier particles of dust, lint or ravelings which may come from the edge of the goods passing between the rollers 22 and 27 will tend to pass downward through opening 12 into the chamber within base 10 and thus be prevented from entering the chamber within housing 13 and which latter chamber is occupied by the greater portion of the operating parts of the machine.

Fixed on shaft 26 is a worm 30, the same meshing with a worm wheel 31 and the latter being loosely mounted on a transversely disposed shaft 32. This shaft is journaled in suitable bearings formed on the side walls of housing 13 and one end of said shaft is extended to the outside of housing 13 and provided with a disk 33. This disk is preferably provided with a knurled edge and is adapted to be manually engaged when it is desired to rotate shaft 32 to reset the indicating mechanism to zero position. The worm 30 and worm wheel 31 constitute a reducing gear between the measuring drum and the indicating mechanism of the machine.

A suitable friction clutch 34 is arranged between worm wheel 31 and shaft 32, said clutch being of sufficient strength to lock the worm wheel to the shaft and cause said parts to operate together during the measuring operations.

Journaled in suitable bearings in the upper and rear portions of side walls 13 and substantially above shaft 32 is a shaft 35, the same carrying a small sprocket wheel 36.

Fixed on shaft 32 and in the same vertical plane with the sprocket wheel 36 is a small sprocket wheel 37.

Journaled in suitable bearings in the side walls and front of housing 13 and near the end opposite to the end occupied by the shafts 32 and 35 is a shaft 38 on which is positioned a sprocket wheel 39. Mounted for operation on sprocket wheels 36, 37 and 39 is an endless flexible member 40, preferably a sprocket chain, and pivotally secured to certain of the links thereof are pointers or fingers 41. (See Fig. 6.) These pointers or fingers are arranged on the flexible member 40 at equal distances apart and in the present instance I have shown the flexible member equipped with four of said pointers or fingers. The sprocket wheels just described are disposed so that the overrunning or upper portion of the sprocket chain traverses a path immediately beneath the top cover plate 17 and on a line midway between the openings 15 and 16.

The fingers or pointers 41 are of such length that their outer ends project a short distance beyond the inner edges of the openings 15 and 16. (See Figs. 1 and 4.)

Projecting inwardly from the upper portions of the side walls of housing 13 are horizontally disposed arms or brackets 42, (see Fig. 4) the same being arranged in pairs and provided at their inner ends with substantially U-shaped bearings 43. These bearings 43 are disposed so that the shafts 44 journaled therein occupy positions directly below the openings 15 and 16 in the top plate of the housing and both shafts are detachably connected at one end to short stub shafts 45, (see Fig. 3) the latter being journaled in suitable bearings 46 formed in one of the end walls of housing 13 and the outer ends of said stub shafts carrying operating disks 47.

Carried by each shaft 44 and arranged between the bearings 43 is a drum or cylindrical body 48 and formed in the periphery of each drum is a longitudinally disposed groove 49, the same being substantially dovetail shape in cross section.

Fitting tightly on the periphery of each drum is a sheet 50 of thin flexible material such as paper or celluloid, on the surface of which appear longitudinally disposed graduated scales properly numbered and which are for the purpose of indicating the cost per yard and fractions of yards of the goods measured in the machine.

Each flexible sheet is wrapped around its cylinder so that the edges of said sheet are positioned in the dove-tailed groove 49 and positioned in said groove over said edges is a plate 51, on the outer surface of which is a graduated scale properly numbered to designate yards and fractional parts thereof, and the marks or graduations of this scale are spaced apart to correspond with the markings of the price scales which appear on the surface of sheet 50. (See Fig. 5.)

By utilizing a pair of drums 48 and making each drum of such size as to accommodate a number of the cost price scales, the capacity of the machine is relatively large and it is possible to readily ascertain the cost price of goods which sell at various prices per yard running from a cent or a cent and a half up to several dollars per yard. The chart-carrying drums are of such size and the double pointers or fingers 41 are of such length that when the parts are properly assembled for use, the pointed ends of the fingers travel in paths immediately adjacent to the surfaces of the drums and particularly those portions which are visible through the openings 15 and 16 in the top plate of the housing. (See Figs. 1 and 4.)

Secured in any suitable manner to one of the side walls of base housing 10 and immediately below the depressed portion 11 of the top plate is a plate 52, (see Figs. 2 and 4) the upper edge of which is sharpened to form a cutting edge 53. Pivotally secured to the side of base housing 10 and near the rear end thereof is one end of a lever 54, the forward portion of which carries a plate 55, the lower edge of which is sharpened so as to coöperate with the cutting edge 53 on plate 52. The free end of lever 54 is provided with an outwardly projecting ear or plate 56. The pivoted end of this lever 54 is provided with a spring (not shown) which normally maintains the lever in an elevated position.

Formed integral with the side walls of the housing 13 are inwardly projecting sockets 57 and 58, (see Fig. 4) the same being square or non-circular in cross section and adapted to be removably positioned in the socket 57 is the rear end of an angle bracket or arm 59, the front or forward portion of which is adapted to serve as a support for a bolt or roll of comparatively narrow material, such as ribbon. This front forward portion of the angle bar or arm occupies a position in alinement with the opening A between the depressed portion 11 of the top plate of the base 10 and the front portion of the bottom plate of the upper housing 13 and which opening is traversed by the goods being measured in the machine.

Figure 1:
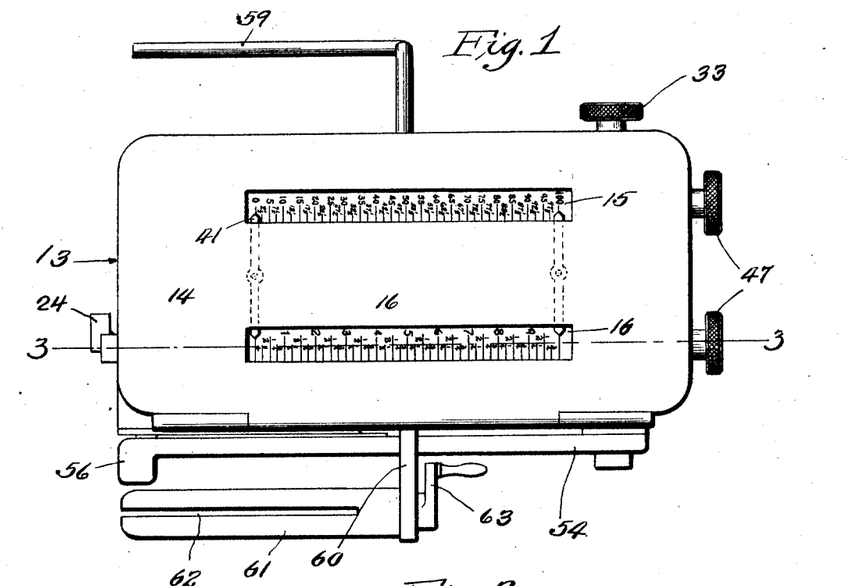
Figure 1 is a top plan view of a fabric measuring and cost computing machine of my improved construction and showing the attachments for supporting rolls of narrow material.
Figure 2:
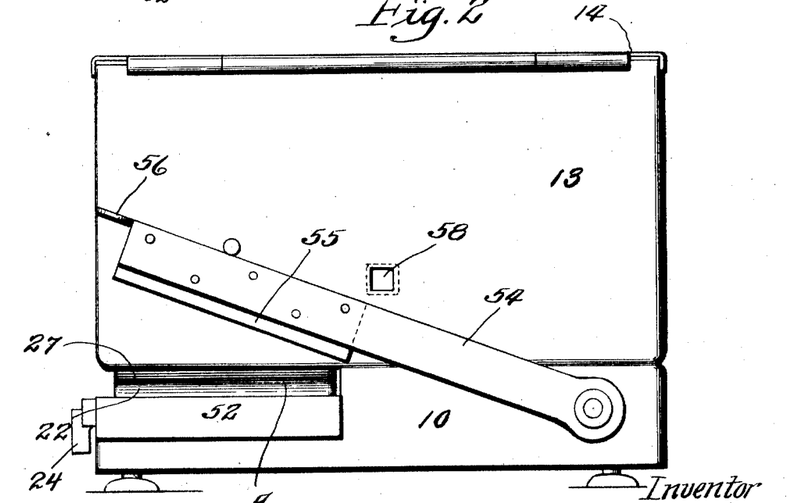
Fig. 2 is a side elevational view of the machine.

Adapted to be removably positioned in the opposite socket 58 is the inner end of a horizontally disposed bracket 60, Fig. 1, and journaled therein is one end of a hollow cylinder 61, the same being slotted lengthwise as designated by 62 and that end of the cylinder which is journaled in bracket 60 is provided with a small crank handle 63 whereby the cylinder 61 may be readily rotated.

In order to firmly anchor my improved machine upon a comparatively smooth counter or showcase, I locate on the underside of the base 10 and preferably at the corners thereof, relatively small vacuum cups or concave disks 10ª of rubber which, by virtue of the partial vacuum produced when they are in contact with a smooth surface, hold the machine securely in position during the measuring operations.

In the modified form of the machine illustrated in Figs. 7 to 10 inclusive, the chart-carrying drums 48 are dispensed with and the hinged top plate or cover 64 for the upper housing of the machine is provided with a longitudinally disposed raised rib 65 in the sides of which are formed slots 66. The overrunning portion of the chain or endless tape traverses the space immediately beneath the rib 65 and the projecting portions of the pointers or fingers extend through the slots 66 in said rib. (See Fig. 8.)

Formed in the top plate 64 to the sides of the rib 65 are longitudinally disposed depressed portions or grooves 67 and adapted to be removably positioned therein are elongated plates 68 of metal, celluloid or the like, the faces of which are provided with graduated scales, one of which is numbered to designate yards and fractional parts thereof and the other being numbered to designate the cost price of goods per yard and the fractional portions thereof. Where this construction is utilized, it will be understood that there are a number of elongated plates provided for use in indicating the cost prices of the goods. For instance—there may be ten or twenty of such plates and both faces of each plate bearing a graduated cost price scale, all of the latter being differently numbered so as to take care of goods ranging in price from a cent or a cent and a half per yard up to several dollars per yard.

Figure 3:
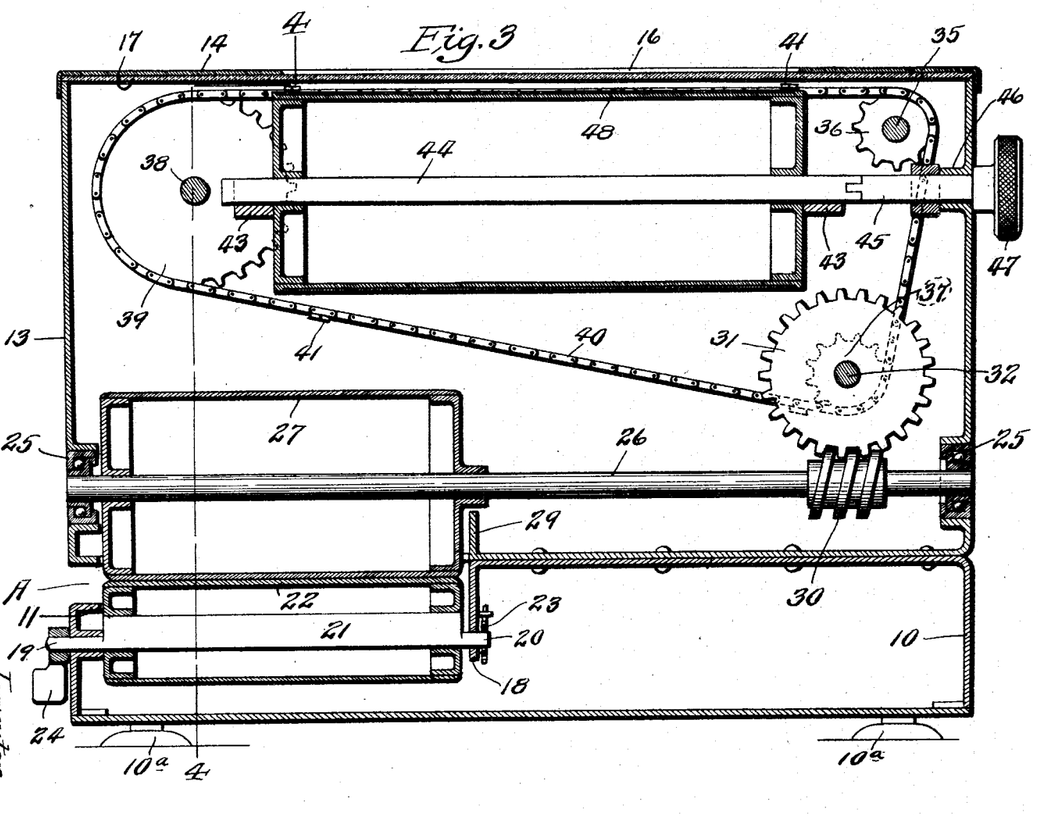
Fig. 3 is an enlarged vertical section taken approximately on the line 3—3 of Fig. 1.
Figure 4:
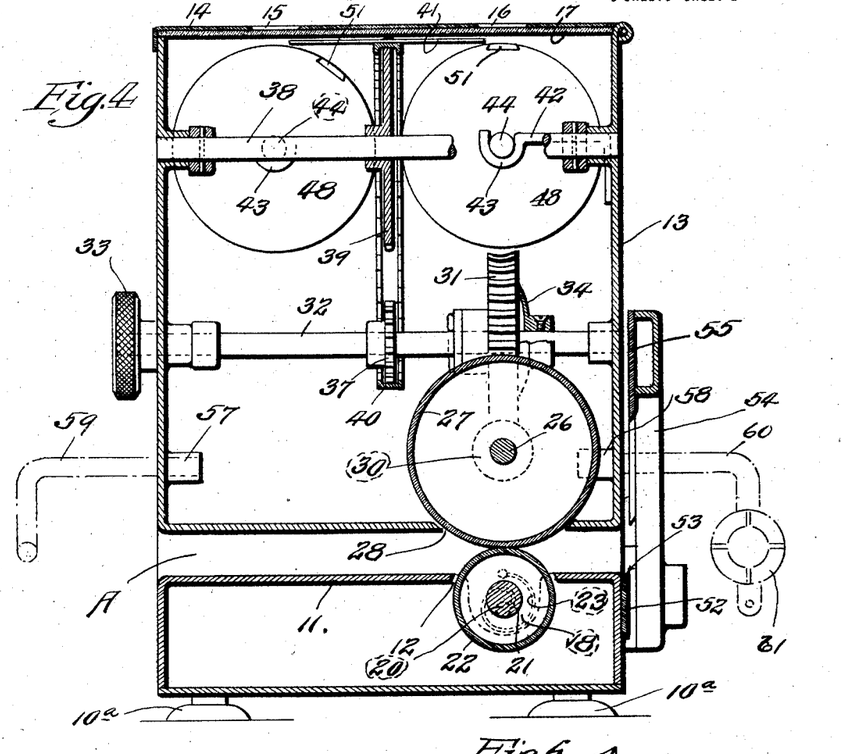
Fig. 4 is a cross sectional view taken approximately on the line 4—4 of Fig. 3.

The operation of my improved machine is as follows:

Assuming that a customer desires seven and one-half (7½) yards of material selling at six and two-thirds cents (6⅔¢) per yard, the salesman manually engages the disks 47 and rotates the same to bring the yard-indicating scale 51 into view through one of the openings in the top plate 14 and rotates the other drum so as to bring the six and two-thirds graduated scale into view through the other opening after which disk 33 is manipulated to rotate shaft 32 and bring one of the double pointers 41 into position in alinement with the zero marks of the two scales which are immediately beneath the openings 15 and 16. Plate 24, see Fig. 3, is now engaged by the thumb or finger to rock the trunnions 19 and 20 in their bearings, thereby moving the eccentrically disposed shaft 21 and drum 22 carried thereby downward and out of contact with measuring drum 27. The edge of the goods to be measured is now placed in opening A between the drums 22 and 27 and the end of the piece of goods is brought into contact with the knife-edge 53 on plate 52. Plate 24 is now manipulated to rock shaft 21 and cause roller 22 to move upward into contact with the goods positioned beneath measuring drum 27 and the goods is now pulled toward the right hand through opening A and between the drums 22 and 27.

It will be understood that drum 22 bears with considerable pressure against the goods passing between the drums, such pressure being created by the tension in spring 23 and as the pulling through of the goods continues, the measuring drum 27 will be rotated, thereby rotating shaft 26 and transmitting such rotary motion to shaft 32 through the worm 30 and worm wheel 31. As shaft 32 is thus rotated, the flexible member 40 will be moved around the sprocket wheels 37, 36 and 39 and the double pointer or finger 41 which was set to the zero positions on the graduated scales appearing through openings 15 and 16, will be moved over the edges of said scales to indicate the amount of goods being drawn through the machine and the cost price or amount to be charged therefor.

When the pointer or finger which is moved along the edge of the yard scale reaches the indicating numerals 7½ on said scale, the opposite or other pointer will bear directly opposite the graduation numbered 50 on the cost price scale, thereby indicating that the total amount to be charged for the measured piece of goods is fifty cents (50¢).

In the event that the customer should desire to take a greater or less amount of goods than the amount originally indicated, namely, seven and one-half (7½) yards, the salesman moves the goods forward or backward between the rollers as the case may be and the pointers will always correctly indicate the proper amount of goods measured and likewise the cost price to be charged therefor.

Necessarily, as the goods is moved reversely through the machine or between the rollers, the pointers will move toward the zero points on the graduated scales.

After the measuring operation has been accomplished, the salesman moves the lever 54 downward by pressing on plate 56 and the blade 55 coöperating with blade 52 will make a short cut in the edge of the goods, which cut serves as a guide for the salesman in cutting off in the usual manner the measured portion of the goods.

To restore the pointers to the zero positions on the graduated scales, the salesman rotates shaft 32 by proper manipulation of disk 33 and this action drives the sprocket chain 40 through sprocket wheel 37 but during this operation, movement is not imparted to worm wheel 31, shaft 26 and measuring drum 27, owing to the arrangement of friction clutch 34 between said shaft 32 and worm wheel 31.

Figures 5, 6:
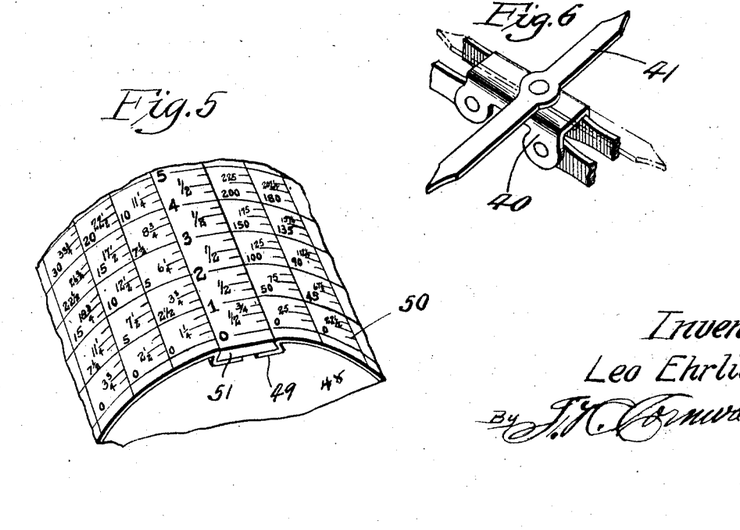
Fig. 5 is a perspective view of a portion of one of the chart carrying drums with a chart attached.
Fig. 6 is a perspective view of a portion of the pointer or indicating finger carrying chain.

In the event that it is desired to move the drums 48 from the machine, the cover plate 14 is elevated and the fingers or pointers 41 are given a quarter turn so as to bring them into alinement with the sprocket chain as shown by dotted lines in Fig. 6, after which the shafts 44 carrying said drums are detached from the stub shafts 45 and lifted from their bearings 43.

In measuring comparatively narrow material such as ribbon, it is desirable that the measured portion be wound into a small roll in order that it may be conveniently handled, and for this purpose I have provided the bracket or arm 59 which serves as a support for the bolt of ribbon or the like and the slotted drum 61 onto which the measured portion of the ribbon is wound through manipulation of crank handle 63, Fig. 1. When this crank handle is operated the ribbon is drawn through the machine and wound in a comparatively small roll on the member 61 from whence it can be readily removed and delivered to the customer.

It will be understood that the bracket or arm 59 and slotted drum 61 are readily detachable from the body of the machine and that it is my intention to supply these parts with every machine sold, thereby making it possible for a store-keeper who purchases but one machine to utilize the same as a cloth or fabric measuring machine and likewise for a ribbon or lace measuring and computing machine.

I desire to call particular attention to the form of chart used in my improved machine, said chart being cylindrical in form or arranged on the surface of a cylinder and composed of a plurality of graduated scales bearing cost price indicia and a single graduated scale bearing lineal measurement indications. In this connection it will be understood that the indicia or numbers on the graduations of the cost price scales can gradually increase from a comparatively low price per yard to a comparatively high price, and thus with two scale or chart bearing drums, an extremely wide range of cost prices can be taken care of.

In the form of machine illustrated in Figs. 11 to 14 inclusive and which machine is adapted for registering the amount of cash and goods involved in each transaction, one of the drums 48 is removed from the machine and positioned in its place and directly beneath the cover plate 14 is a horizontally disposed plate 70, one side of which is fixed to one of the side walls of the housing 13. A portion of this plate lies immediately beneath the corresponding end of pointer 41, and which latter in this particular instance carries on its underside and near its outer end, a short punch pin 41ª, the latter being adapted to enter any one of a row of apertures 71, which latter are formed through plate 70. Projecting upwardly from plate 70 and at points adjacent to the corners thereof, are relatively short pins 72.

Figure 14:
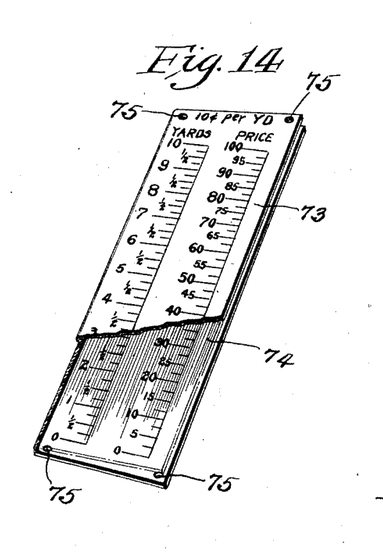
Fig. 14 is a perspective view of one of the duplicate sales slips or tickets.

The duplicate sales slip or ticket utilized in this form of machine is illustrated in Fig. 14, and preferably formed of paper doubled at a central line, thereby forming upper and lower sections 73 and 74 which are identical in size. Preferably the line along which the section of paper is doubled to form the two slips 73 and 74 is weakened by a row of perforations or the like, thereby facilitating the separation of the two slips after the same have been marked.

Each slip is printed on its upper face with a lineal measurement scale and a price scale, the same corresponding, that is, the numbers opposite the graduated marks of the price scale represent the amounts to be paid for pieces of goods corresponding to the oppositely disposed marks on the lineal measurement scale.

The duplicate sales slip illustrated in Fig. 14 is illustrated as being applicable for use where goods are to be used at ten cents per yard, and obviously where the machine is used for selling piece goods varying in price per yard, it will be necessary to furnish the salesman or person using the machine with a supply of sales slips having price per yard scales corresponding to the various prices of the goods being sold. Both sections of the duplicate sales slip are provided adjacent to their corners with apertures 75, and which latter are adapted to receive the pins 72 on plate 70, thereby properly positioning the sales slip on said plate and holding it in proper position relative to the row of apertures 71 and the pointer 40 which carries the punch pin 41ª. The apertures 71 are spaced apart so that they occupy positions directly beneath the marked graduations of the price per yard scale.

When this type of machine is in use, the salesman selects the proper sales ticket and after lifting the cover plate 14 places said ticket on the plate 70 with the pins 72 projecting through apertures 75. The goods is now drawn through the machine in the manner heretofore described, and as a result, the end of pointer 41 carrying punch pin 41ª will move over the sales slip until the measuring operation has been completed, after which the operator lifts cover plate 14, and then with the thumb or finger presses downward on the end of the pointer 41 carrying the punch pin 41ª and the latter will be forced through the two parts of the duplicate sales slip, thereby punching apertures in said parts directly opposite the graduated mark on the price per yard scale which represents the total amount to be paid for the measured piece of goods and which graduated mark is directly opposite or in direct alinement with the graduated mark on the lineal measurement scale which indicates the amount of goods measured.

The operator now removes the duplicate sales slip from the machine and separates the two parts or sections along the weakened line and delivers one of said sections to the purchaser and the other part to the cashier, bookkeeper or person in charge of sales. Obviously the sales slip which is delivered to the cashier or bookkeeper will be of great assistance in keeping the records of all transaction or sales made by a particular department or any of the clerks or salesmen therein.

A fabric measuring and cost computing machine of my improved construction is comparatively simple, can be easily and cheaply manufactured, includes a minimum number of operating parts, presents a neat and finished appearance when properly constructed, and is very effective and accurate in measuring and computing the cost price of all kinds of piece goods and particularly cloth, fabric, ribbon and like materials usually sold in dry goods stores.

It will be readily understood that minor changes in the size, form and construction of the various parts of my improved fabric measuring and cost computing machine may be made and substituted for those herein shown and described, without departing from the spirit of my invention, the scope of which is set forth in the appended claims.

I claim:

1. In a machine of the class described, an endless flexible member mounted for operation, means adapted to be actuated by the goods passing through the machine for imparting movement to said endless flexible member, a sales slip support arranged adjacent to a portion of said endless flexible member, and means carried by said flexible member and adapted to be manually actuated to mark a sales slip positioned on said support.

2. In a machine of the class described, an endless flexible member mounted for operation, means adapted to be actuated by the goods passing through the machine for imparting movement to said endless flexible member, a perforated support for a sales slip, a resilient member carried by the flexible member and overlying a portion of the support, which resilient member is capable of being manually pressed toward the sales slip support, and a punch carried by said resilient member and adapted to perforate a sales slip positioned on the support when the resilient member is pressed toward said support.

3. In a machine of the class described, a support for a sales slip, an adjustable member arranged adjacent to and substantially parallel with said support, the face of said adjustable member bearing a lineal measurement scale, an endless flexible member mounted for operation between the support and the adjustable member, a pointer carried by said endless flexible member, the ends of which pointer are adapted to travel in paths adjacent to the sales slip support, and the adjustable member, a part of said pointer capable of being manually actuated to mark a sales slip positioned on the support, and means adapted to be actuated by the goods passing through the machine for imparting movement to said endless flexible member.

4. In a machine of the class described, a support for a sales slip, an adjustable member arranged adjacent to and substantially parallel with said support, the face of said adjustable member bearing a lineal measurement scale, an endless flexible member mounted for operation between the support and the adjustable member, a pointer carried by said endless flexible member, the ends of which pointer are adapted to travel in paths adjacent to the sales slip support and the adjustable member, a part of said pointer capable of being manually actuated to mark a sales slip positioned on the support, and means adapted to be actuated by the goods passing through the machine for imparting movement to said endless flexible member, which last mentioned means includes a measuring roller and a pressure roller coöperating therewith.

5. In a machine of the class described, a rotatably mounted measuring roller which is adapted to be engaged by goods drawn through the machine, an endless flexible member, supports therefor, driving connections between the measuring roller and one of the supports for said endless flexible member, a fixed support positioned adjacent to a straight running portion of said endless flexible member, which support is adapted to receive a removable sales ticket, and a pointer carried by said endless flexible member and adapted to travel in a path above said support and the sales ticket thereupon to indicate upon the latter the amount of goods drawn through the machine and engaged by the measuring roller.

6. In a machine of the class described, the combination of a member mounted for movement, means including a measuring roller adapted to be operated by the goods passing through the machine for imparting movement to said member, a support positioned adjacent to the path of travel of the first mentioned member, which support is adapted to receive a sales ticket, and means carried by said movable member and adapted to be manually actuated to mark the sales ticket positioned upon the support.

7. In a machine of the class described, the combination of a member mounted for movement, means including a measuring roller adapted to be operated by the goods passing through the machine for imparting movement to said member, a support positioned adjacent to the path of travel of the first mentioned member, which support is adapted to receive a sales ticket, means carried by said movable member and adapted to be manually actuated to mark the sales ticket positioned upon the support, and manually operable means for moving the movably mounted member independently of its operating means.

8. In a machine of the class described, a housing, a support arranged therein and adapted to receive a removable sales ticket, said support being provided with a row of perforations, a member movable in a path adjacent to said support, means including a measuring roller that is adapted to be engaged by the goods passing through the machine for imparting movement to said movable member, and a punch pin on said member, which punch pin is adapted to pass through the sales ticket positioned upon said support and to enter the perforations in the latter.

9. In a machine of the class described, a support adapted to receive a removable sales ticket, said support being provided with a row of perforations, means for retaining a sales ticket in a predetermined position upon said support, a member movable in a path adjacent to said support, and a punch pin carried by said member and adapted when said movable member is manually actuated to enter one of the perforations in said support.

10. In a machine of the class described, the combination of a support adapted to receive a removable sales ticket, means for retaining said sales ticket in a predetermined position on the support, a member arranged for movement over said support and a duplicate sales ticket positioned thereon, means carried by said member and adapted to be actuated to mark the duplicate sales ticket, and means including a measuring roller adapted to be actuated by the goods passing through the machine for moving said member over the support and the sales ticket positioned thereon.

11. In a fabric measuring and cost computing machine, the combination with a flexible member mounted for operation, of a measuring roller adapted to be actuated by the goods drawn through the machine, driving means coöperating with said roller and said flexible member to move the latter in a direct line, a price ticket support positioned adjacent to a straight running portion of the flexible member, a pointer carried by said flexible member and adapted to successively indicate the graduations on the scale of the price ticket placed on said support, and means on said pointer for marking said price ticket when said pointer is manually forced against said ticket.

12. In a fabric measuring and cost computing machine, the combination with a drum bearing on its periphery, a chart made up of a series of graduated scales bearing cost price data, of an endless flexible member arranged for operation adjacent to said drum, means adapted to be actuated by the goods passing through the machine for imparting movement to the endless flexible member, said means including a measuring roller and a pressure roller coöperating therewith for retaining the goods in frictional contact with said measuring roller, a pointer on said endless flexible member, which pointer is adapted to travel in a path parallel with the axis of the drum and adjacent to the periphery thereof and means whereby said drum may be rotated to bring any one of the scales thereof into registry with the pointer.

13. In a fabric measuring and cost computing machine, a flexible member mounted for operation, means including a measuring roller that is adapted to be engaged by goods drawn through the machine for imparting movement in a direct line to said flexible member, a sales ticket support positioned adjacent to a straight running portion of said flexible member, a finger carried by the flexible member and overlying the ticket support, said finger being movable toward and away from the support, and means on said finger for marking a ticket positioned upon said support when said finger is forced against the ticket on said support.

14. The combination with a fabric measuring and computing machine housing, of an angle-shaped bracket one leg of which is detachably applied to one side of the housing, the other leg being adapted to support a roll of relatively narrow flexible material, a bracket removably positioned on the other side of the housing and a slotted winding drum supported by said last mentioned bracket.

15. In a machine of the class described, the combination with a pair of drums each provided on its face with a plurality of charts arranged in parallel relationship and bearing lineal measurement indicia and cost price indicia, of a flexible member arranged for operation between said charts, a double pointer carried by said flexible member, the ends of which pointer are adapted to travel in paths parallel with and adjacent to said charts, a measuring roller mounted for operation, driving connections between said roller and flexible member and a yieldingly mounted pressure roller adapted to engage the goods drawn through the machine and maintain the same in frictional engagement with said measuring roller.

16. In a machine of the class described, the combination with a pair of charts arranged in parallel relationship and bearing lineal measurement indicia and cost price indicia, of a flexible member arranged for operation between said charts, a double pointer carried by said flexible member, the ends of which pointer are adapted to travel in paths parallel with and adjacent to said charts, a measuring roller adapted to be actuated by goods drawn through the machine, a yieldingly mounted pressure roller adapted to engage the goods drawn through the machine and maintain the same in frictional contact with said measuring roller, driving connections from said measuring roller to said flexible member, and manually operable means for imparting movement to said flexible member independently of said driving means.

17. In a machine of the class described, a housing, a pair of independently operable members arranged in said housing, each of said members bearing a plurality of graduated scales, a flexible member arranged for movement between said scale bearing members with a straight running portion substantially parallel with the scales on said members, a pointer carried by said flexible member, the ends of which pointer are adapted to travel in paths adjacent to the graduated scales, a measuring roller mounted for operation within the housing and adapted to be engaged by goods drawn through the machine, and means actuated by said measuring roller for driving the flexible member.

18. In a fabric measuring and cost computing machine, the combination with a flexible member mounted for operation and having a straight-running portion, of a measuring roller adapted to be actuated by goods drawn through the machine, driving means coöperating with said roller and said flexible member whereby the latter is moved as said roller is operated, a relatively stationary chart positioned adjacent to the straight-running portion of the flexible member, and a pointer carried by said flexible member and adapted to successively indicate the graduations on said chart.

19. In a fabric measuring and cost computing machine, the combination with a relatively stationary chart made up of substantially parallel rows of lineal measurement and cost price indicia, of a rotary member adapted to be engaged and actuated by goods drawn through the machine, an endless flexible member mounted for operation by said rotary member and having a straight running portion that is substantially parallel with the rows of indicia on the chart, and a pointer carried by said flexible member for successively indicating the indicia on said chart.

20. In a fabric measuring and cost computing machine, a rotatably mounted member bearing on its periphery a plurality of substantially parallel rows of lineal measurement and cost price indicia, a rotary member adapted to be engaged and actuated by goods drawn through the machine, an endless flexible member mounted for operation within the machine and having a straight-running portion that is disposed substantially parallel with the rows of indicia on the cylindrical member, driving connections from the rotary member to said flexible member, and a pointer carried by said flexible member for successively indicating the indicia on the cylindrical member.

In testimony whereof I hereunto affix my signature this 12th day of February, 1918.

LEO EHRLICH.